United States Patent
Bowler et al.

(10) Patent No.: US 10,019,384 B2
(45) Date of Patent: *Jul. 10, 2018

(54) MEMORY TAMPER DETECTION

(71) Applicant: Synopsys, Inc., Mountain View (CA)

(72) Inventors: Michael Kenneth Bowler, Ottawa (CA); Andrew Alexander Elias, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,036

(22) Filed: Jan. 23, 2017

(65) Prior Publication Data

US 2017/0132160 A1 May 11, 2017

Related U.S. Application Data

(63) Continuation of application No. 14/625,387, filed on Feb. 18, 2015, now Pat. No. 9,563,577.

(51) Int. Cl.
| | | |
|---|---|---|
| *G06F 21/00* | (2013.01) | |
| *G06F 12/14* | (2006.01) | |
| *G06F 21/44* | (2013.01) | |

(52) U.S. Cl.
CPC ......... *G06F 12/1458* (2013.01); *G06F 21/44* (2013.01); *G06F 2212/1052* (2013.01)

(58) Field of Classification Search
CPC ...................................................... G06F 21/44
USPC .......................................................... 726/17
See application file for complete search history.

(56) References Cited

U.S. PATENT DOCUMENTS

| | | | | |
|---|---|---|---|---|
| 6,952,795 | B2* | 10/2005 | O'Gorman | G06F 11/221 |
| | | | | 714/33 |
| 2011/0202998 | A1* | 8/2011 | Dullien | G06F 21/564 |
| | | | | 726/24 |
| 2014/0298026 | A1* | 10/2014 | Isozaki | H04L 9/0825 |
| | | | | 713/171 |

* cited by examiner

*Primary Examiner* — Longbit Chai
(74) *Attorney, Agent, or Firm* — Jaquez Land Greenhaus LLP; Bruce W. Greenhaus, Esq.

(57) ABSTRACT

A method and system for detecting tampering of authenticated memory blocks that are accessible by an untrusted host processor, by (1) periodically re-authenticating the memory blocks from a trusted computing environment, and (2) disabling accessing of the memory blocks by the untrusted host processor when the re-authenticating fails. In one implementation, each of the memory blocks has an authentication code, and the accessing of the memory blocks is disabled by disabling the untrusted host processor. The memory blocks may be re-authenticated sequentially, or randomly, e.g., based on a random block selection based on the block location, or based on temporal randomness. The re-authenticating is preferably effected by an authentication module in the trusted computing environment.

14 Claims, 1 Drawing Sheet

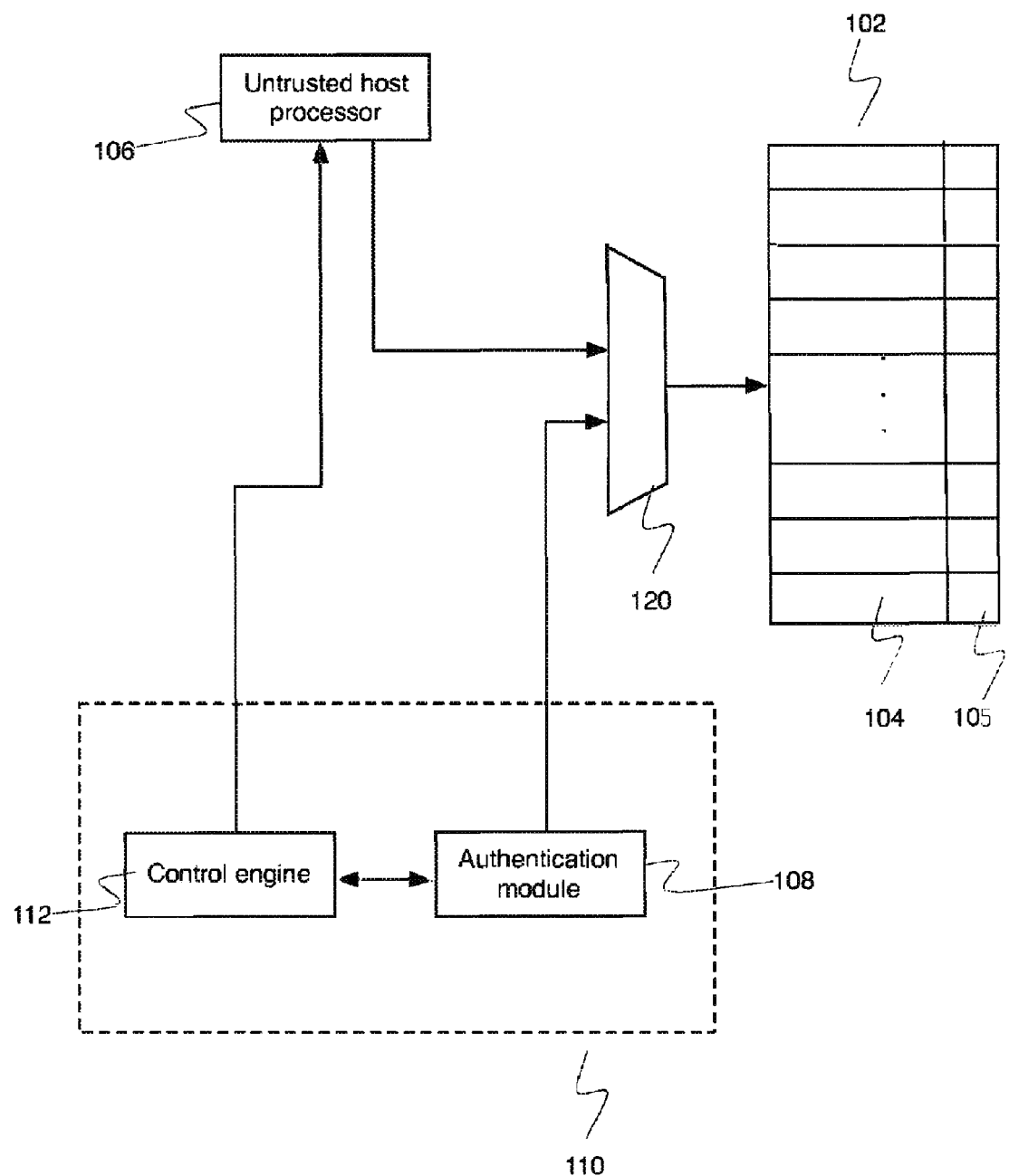

MEMORY TAMPER DETECTION

CROSS REFERENCE TO RELATED APPLICATIONS

This application is a continuation application of co-pending application Ser. No. 14/625,387 filed Feb. 18, 2015, entitled "Memory Tamper Detection", the disclosure of which is incorporated herein by reference in its entirety.

FIELD OF THE INVENTION

The present disclosure relates to detection of tampering in memory systems.

SUMMARY

In accordance with one embodiment, a method of detecting tampering of authenticated memory blocks that are accessible by an untrusted host processor. The method includes: (1) periodically re-authenticating the memory blocks from a trusted computing environment; and (2) disabling accessing of the memory blocks by the untrusted host processor when the re-authenticating fails. In one implementation, each of the memory blocks has an authentication code, and the accessing of the memory blocks is disabled by disabling the untrusted host processor. The memory blocks may be re-authenticated sequentially or randomly, e.g., based on a random block selection based on the block location, or based on temporal randomness. The re-authenticating is preferably effected by an authentication module in the trusted computing environment.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 1 is a block diagram of an exemplary memory tampering detection system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Existing secure boot systems authenticate a software image prior to allowing a processor to execute or boot with that software image. This checks the authenticity of the image immediately prior to the execution, but any changes made to the image after the authentication check are not detected. It is therefore possible for an unauthorized or malicious entity to change the software image to an unauthorized version after is has been authenticated. This problem is generally the same with any type of authenticated memory blocks, whether it stores software or data. There is a need to detect tampering of authenticated memory blocks after the initial authentication.

Referring to FIG. 1, a memory 102 consists of one or more memory blocks 104 each with an associated Message Authentication Code (MAC) 105. The memory may comprise software instructions (e.g., a boot image) and/or data. The software is executed (or the data is accessed) by an untrusted host processor 106. When the memory blocks are written into memory initially, they are authenticated by an authentication module 108 located in a trusted computing environment 110. After the initial authentication, a control engine 112, preferably running as a background low priority task in the trusted computing environment 110, triggers periodic re-authentications of one or more of the memory blocks 104. Any authentication process(es) known in the art can be used for as the authentication module, including, for example a cryptographic authentication process.

The memory 102 generally only has one read port 120, which is shared by the untrusted host processor 106 and the authentication module 108.

In one embodiment, the control engine 112 triggers a re-authentication process of each memory block sequentially. In order to avoid blocking access to the memory by the host processor 106, the control engine 112 preferably waits for a predetermined delay before triggering the authentication module 108 to re-authenticate another memory block 104. If the re-authentication process fails, the control engine 112 disables the host processor 106. The predetermined delay can be programmable or dynamically adjusted as to minimize the performance impact on the host processor 106.

The control engine 112 may interface with one or more random number generation processes to generate random numbers used to randomize the re-authentication process.

In another embodiment, the control engine 112 waits for a random amount of time before triggering the re-authentication process of a block.

In another embodiment, the control engine 112 triggers the authentication Module 108 to re-authenticate random memory blocks, so it is not possible to predict which block will be authenticated next. The randomness may be temporal, wherein each block is re-authenticated at a random time. The randomness may be located-based, wherein the block to be re-authenticated is selected randomly based on its location.

In another embodiment, the memory 102 is segmented in regions comprising two or more memory blocks. The control engine 112 maintains a list of regions to re-authenticate and triggers the authentication engine to periodically execute a re-authentication process on one selected region. The selection of the region to re-authenticate may be random, either temporarily or location-based as explained above.

In another embodiment, the control engine can be re-programmed periodically to change between two or more of the re-authentication modes described above. For example, the control engine may alternate between temporal and location-based randomness for the re-authentication of the blocks. As another example, it could periodically swtich between block-based re-authentication and region-based re-authentication.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of detecting tampering of authenticated memory blocks that are accessible by an untrusted host processor, the method comprising:
   periodically re-authenticating the content of the memory blocks using a control engine from a trusted computing environment, wherein the control engine triggering the periodical re-authentication process of one or more of the memory blocks via an authentication module, and
   using the control engine to generate a signal to disable the untrusted host processor from generating any output control signal when the re-authenticating fails.

2. The method of claim 1 in which each of the memory blocks has an authentication code.

3. The method of claim 1 in which the memory blocks are re-authenticated sequentially.

4. The method of claim 1 in which the memory blocks are re-authenticated randomly.

5. The method of claim 4 in which the memory blocks are randomly re-authenticated based on a random block selection based on the block location.

6. The method of claim 4 in which the memory blocks are randomly re-authenticated based on temporal randomness.

7. The method of claim 1 in which the re-authenticating is effected by an authentication module in the trusted computing environment.

8. A system to detect memory tampering comprising:
   a memory having only one read port;
   host processor coupled to the read port and comprising a plurality of memory blocks, each of the memory blocks having an authentication code;
   a control engine triggering a periodical re-authentication process of one or more of the memory blocks via an authentication module coupled to share the read port of the memory with the host processor, wherein the authentication module coupled to the control engine to perform an authentication process through the read port of the memory, upon the authentication process being triggered by the control engine; and
   the control engine capable of generating a signal to disable the host processor from generating any output control signal when a re-authentication fails.

9. The system of claim 8 wherein two or more memory blocks are grouped in a memory region and the control engine triggers the periodical re-authentication of a memory region via the authentication module.

10. The system of claim 8 wherein the control engine is periodically reprogrammed to one of a plurality of re-authentication processes.

11. The system of claim 10, wherein the control engine waits a predetermined delay before triggering the authentication module to re-authenticate another memory block.

12. The system of claim 10, wherein the predetermined delay is programmably adjusted to minimize the performance impact on the host processor.

13. The system of claim 10, wherein the predetermined delay is dynamically adjusted to minimize the performance impact on the host processor.

14. The system of claim 10, wherein the control engine triggers a re-authentication process of each memory block sequentially.

* * * * *